(12) United States Patent
Save et al.

(10) Patent No.: US 11,936,193 B1
(45) Date of Patent: Mar. 19, 2024

(54) METHOD AND DEVICE FOR RECOVERING ELECTRICAL ENERGY FROM A SINGLE-PHASE OR MULTIPHASE POWER CABLE

(71) Applicant: SOCOMEC, Benfeld (FR)

(72) Inventors: Thierry Save, Coulanges les Nevers (FR); Dominique Gautard, Varennes Vauzelles (FR)

(73) Assignee: SOCOMEC, Benfeld (FR)

( * ) Notice: Subject to any disclaimer, the term of this patent is extended or adjusted under 35 U.S.C. 154(b) by 0 days.

(21) Appl. No.: 18/276,489

(22) PCT Filed: Apr. 5, 2022

(86) PCT No.: PCT/EP2022/058965
§ 371 (c)(1),
(2) Date: Aug. 9, 2023

(87) PCT Pub. No.: WO2022/218754
PCT Pub. Date: Oct. 20, 2022

(30) Foreign Application Priority Data

Apr. 16, 2021 (FR) .................................. FR2103953

(51) Int. Cl.
*H02J 50/00* (2016.01)
*H02J 50/10* (2016.01)
*H02J 50/90* (2016.01)

(52) U.S. Cl.
CPC ............ *H02J 50/001* (2020.01); *H02J 50/10* (2016.02); *H02J 50/90* (2016.02)

(58) Field of Classification Search
CPC ........... H02J 50/001; H02J 50/90; H02J 50/10

USPC .......................................................... 307/104
See application file for complete search history.

(56) References Cited

U.S. PATENT DOCUMENTS

| | | | |
|---|---|---|---|
| 6,900,391 B1 * | 5/2005 | Maeda | H01B 7/0009 174/128.1 |
| 10,651,686 B2 | 5/2020 | White et al. | |
| 2004/0231883 A1 * | 11/2004 | Kondo | H01B 3/443 174/128.1 |
| 2006/0011378 A1 * | 1/2006 | Maeda | H01B 13/0006 174/128.1 |
| 2008/0310069 A1 | 12/2008 | Divan et al. | |
| 2009/0266575 A1 * | 10/2009 | Yoshimoto | H01B 7/0009 174/128.1 |
| 2022/0059257 A1 | 2/2022 | Gautard et al. | |

FOREIGN PATENT DOCUMENTS

| | | |
|---|---|---|
| FR | 3093588 A1 | 9/2020 |
| JP | 4927761 B2 | 5/2012 |
| WO | WO2011012143 A1 | 2/2011 |

* cited by examiner

*Primary Examiner* — Alfonso Perez Borroto
(74) *Attorney, Agent, or Firm* — FORGE IP, PLLC

(57) ABSTRACT

A device for recovering energy from a single-phase power cable includes two phase conductors, a magnetic core, in the form of an openable torus, installed around the power cable to form a magnetic circuit able to pick up a magnetic field induced by a primary current passing through the phase conductors, a detection coil wound around the magnetic core, to induce a secondary voltage from the induced magnetic field and deliver across the coil an output voltage usable to power electrical systems, and a heterogeneous magnetic circuit to induce an asymmetrical magnetic flux flow in the magnetic circuit and maximize the output voltage of the detection coil.

28 Claims, 8 Drawing Sheets

Fig. 15
Fig. 16
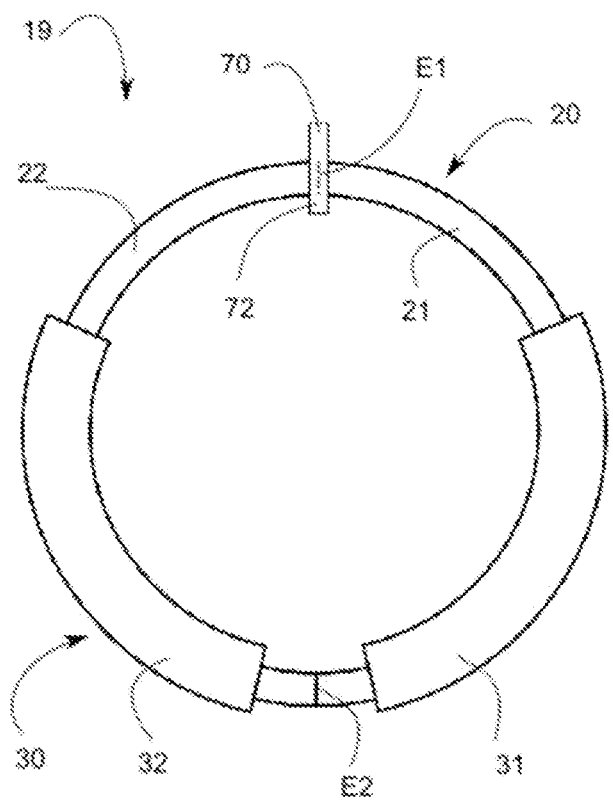
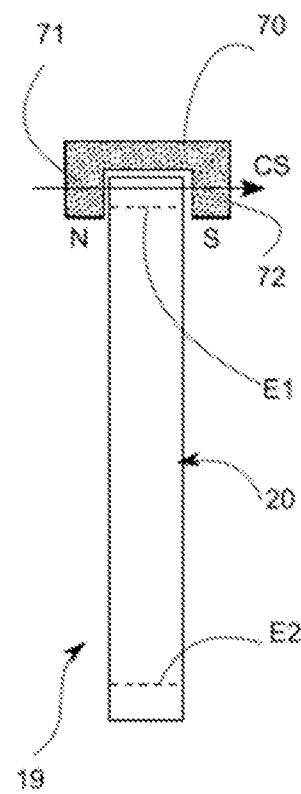
Fig. 17
Fig. 18
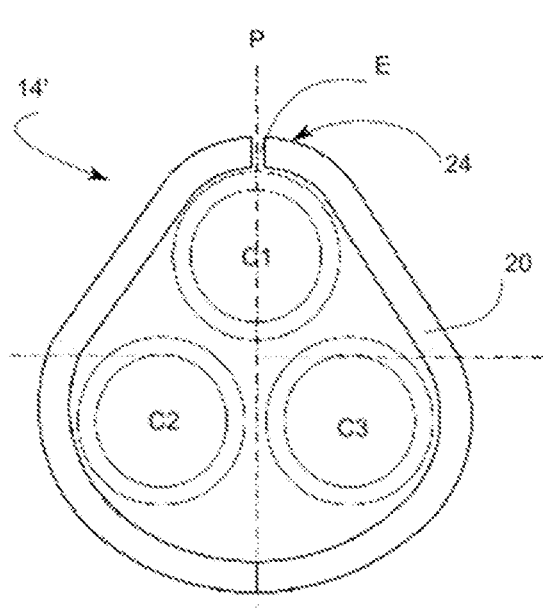
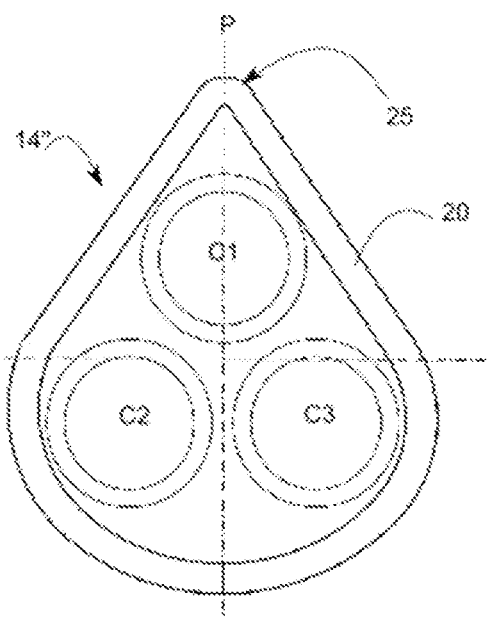

METHOD AND DEVICE FOR RECOVERING ELECTRICAL ENERGY FROM A SINGLE-PHASE OR MULTIPHASE POWER CABLE

TECHNICAL FIELD

This invention relates to a method of recovering electrical energy from a power cable comprising at least two phase conductors, and to an electrical energy recovery device implementing said method and comprising a magnetic core in the form of a torus, to be installed around said power cable and form a magnetic circuit able to pick up a magnetic field induced by the primary current passing through the phase conductors of said power cable, and a detection coil wound around said magnetic core and to be installed to induce a secondary voltage from said induced magnetic field and deliver to the terminals of said detection coil an output voltage enabling various types of electrical systems to be supplied.

PRIOR ART

An increasing number of sensors, systems, and accessories are being installed on electrical networks to provide protection, monitoring, metering, and other functions. In most cases, these devices require an electrical power supply. One solution is to draw this electrical energy directly from the power cables in which an electric current flows, using energy recovery devices based on the principle of self-induction, thus avoiding the need for an additional energy source (battery, renewable energy, etc.).

To achieve this, a magnetic core is usually attached to one of the power cable's phase conductors, through which current flows and which forms a primary circuit. This current creates a radial magnetic field around the phase conductor, which induces the circulation of magnetic flux in the magnetic core. A detection coil is wound around this magnetic core to form a secondary circuit. Thus, the variation in magnetic flux circulating in the magnetic core induces a voltage across the detection coil. After processing the signal, the induced voltage recovered across the detection coil terminals can be used to power several types of electrical systems, such as, by way of example, one or more sensors for temperature, position, current, wear, etc., one or more lighting, signaling, or communication components, etc., without these examples being limitative.

To date, there are various solutions for recovering electrical energy in the form of either a closed or openable toroidal magnetic core, or a wound magnetic cable, an example of which is given in the applicant's FR 3093588 publication. But all these solutions are added to a single phase conductor of the power cable. This is also the case with the solution described in publication WO 2011/012143 A1, which proposes an arc-shaped wound magnetic core that attaches to one of the power cable's phase conductors. U.S. Pat. No. 10,651,686 offers yet another solution in the form of a printed circuit board with at least one induction winding, attached to a phase conductor by cable ties or a clip.

Current solutions are invasive and restrictive in terms of implementation because they can only be mounted or fixed onto one of the power cable's phase conductors. Therefore, they cannot be used directly on multi-conductor power cables, without having to remove the protective sheath in order to separate the phase conductors and isolate a single one. They are also very difficult to install on bundled power cables in cable trays.

Indeed, known electrical energy recovery devices do not work if they are positioned directly on a power cable and around all phase conductors, like a differential current sensor. In this case, the vector sum of the currents flowing in all the phase conductors creates a magnetic field that is generally zero or very weak. They would therefore be inoperative in the context of this invention.

More precisely, in a single-phase power cable with two phase conductors feeding a single-phase receiver, the same current flows in both conductors. If we place a magnetic core around this power cable, in a perfectly symmetrical and balanced electrical system, the magnetic fluxes induced by each phase conductor in the magnetic core are equal and in opposite directions. A detection coil evenly distributed around the circumference of the magnetic core detects the sum of the fluxes. As this sum is zero, no voltage is generated across the winding terminals, as the voltage induced in one turn is compensated by the voltage induced in the diametrically opposed turn.

Similarly, in a three-phase power cable, the currents flowing in the three phase conductors are of the same amplitude but 120° out of phase. A magnetic core placed around the three phase conductors sees a rotating magnetic field whose vector sum is zero over one period. The voltage induced at the terminals of a detection coil evenly distributed around the magnetic core is zero, because at any given time, the voltage induced in one turn is compensated by the sum of the voltages induced in the turns located at 120 and 240° to it.

DISCLOSURE OF THE INVENTION

The purpose of this invention is to provide a new, non-invasive solution for recovering electrical energy from a power cable, based on the principle of self-induction, with the advantage of facilitating the installation of the energy recovery device on said power cable, without needing to insulate one of the phase conductors, enabling a power cable to be fitted with such a recovery device both during manufacture and on site, and to be easily removed and reinstalled on a power cable as required, thus offering flexibility of use and great simplicity of device implementation, while guaranteeing sufficient performance to ensure self-supply of ancillary electrical systems.

To this end, the invention concerns a method for recovering electrical energy consisting of installing around said power cable a magnetic core in the form of a toroid, to form a magnetic circuit capable of capturing a magnetic field induced by a primary current passing through the phase conductors of said power cable, equip said magnetic core with a detection coil to induce a secondary voltage from said induced magnetic field and deliver an output voltage across said detection coil, heterogeneously design said magnetic circuit to generate an asymmetrical magnetic flux flow in said magnetic circuit to maximize said output voltage and thus obtain a usable output voltage across said detection coil.

In a preferred embodiment of the invention, the process involves creating at least one air gap in said magnetic core to create said heterogeneity in the magnetic circuit and generate said asymmetry in the magnetic flux flow.

According to a first embodiment, the process involves using a magnetic core in the form of a closed torus and cutting the cross-section of said magnetic core to create a single air gap whose width L is at least 100 μm, and preferably between 0.5 and 2 mm. It may be possible to divide said single air gap into several elementary air gaps distributed over an angular segment of said magnetic core at most equal to 120°.

In a second embodiment, said magnetic core is cut in half to form an opening torus made up of two half-cores, creating two air gaps, including a main air gap and a secondary air gap. Two air gaps of different widths can be created, including said main air gap of width L1 and said secondary air gap of width L2 less than width L1, width L1 being at least 100 µm, and preferably between 0.5 and 2 mm, and width L2 corresponding to the contacting ends of the two half-cores and being at most 20 µm.

The process may involve dividing said detection coil into at least two coils, located in a zone of the magnetic core opposite said main air gap, and placed on either side of said secondary air gap.

In another alternative of the process, said magnetic core can be offset from said power cable to introduce an offset between said phase conductors and said magnetic circuit, to create said heterogeneity in the magnetic circuit and generate said asymmetry in the magnetic flux flow.

Also, according to another alternative embodiment, a magnet can be added to said magnetic circuit to replace or complement an air gap, placed to generate a saturation field that locally cuts the magnetic flux induced in said magnetic core by said primary current, creating heterogeneity in said magnetic circuit and generating asymmetry in the magnetic flux flow.

Finally, the magnetic core can be angled to create heterogeneity within the magnetic circuit and generate asymmetry in magnetic flux flow.

Advantageously, the process consists in positioning said detection coil in a zone of said magnetic core opposite said air gap, said magnet and/or said angle or said bend to maximize the usable output voltage.

Preferably, the process consists in optimizing the angular position of said magnetic core with respect to said power cable so that said single air gap, said main air gap, said magnet and/or said angle is located opposite one of the phase conductors of said power cable, in which position the usable output voltage across said detection coil is at its maximum. When said power cable is single-phase, the process involves aligning said single air gap, said main air gap, said magnet, and/or said angle with the two phase conductors.

To achieve this angular position, the method consists in detecting the output voltage across said detection coil when installing said magnetic core around said power cable through which said primary current flows, to help locate said optimum angular position, and then locking said magnetic core in this position.

To this end, the invention also relates to an energy recovery device, in which said magnetic circuit is heterogeneous to generate in said magnetic circuit an asymmetrical magnetic flux flow, enabling said output voltage to be maximized and a usable output voltage to be obtained across said coil.

In a preferred embodiment of the invention, said magnetic core may comprise at least one air gap to create said heterogeneity in said magnetic circuit and said asymmetry in the magnetic flux flow.

According to a first alternative embodiment, said magnetic core may be a closed torus, with a single air gap whose width L is at least 100 µm, and preferably between 0.5 and 2 mm. This single air gap may be divided into several elementary air gaps, distributed over an angular segment of said magnetic core equal to 120° at most.

In a second alternative embodiment, the magnetic core may be an open torus comprising two half-tori and two air gaps, including a main air gap and a secondary air gap. Preferably, said air gaps have different widths: said main air gap with width L1 and said secondary air gap with width L2 less than width L1, width L1 being at least equal to 100 µm, and preferably between 0.5 and 2 mm, and width L2 corresponding to the ends in contact with the two half-tori and being at most equal to 20 µm.

Said detection coil may be further divided into at least two coils, located in a zone of the magnetic core opposite to said main air gap, and placed on either side of said secondary air gap.

The energy recovery device can comprise an openable housing in which said magnetic core and said detection coil are housed. In this case, said housing comprises a passage window for said power cable and said passage window can be advantageously off-center with respect to said magnetic core to introduce an offset between said phase conductors and said magnetic circuit. The aforementioned passage window may be provided in a decentralizing member separate from said housing.

In another alternative embodiment, said energy recovery device may comprise a magnet in said magnetic circuit in place of or in addition to an air gap, arranged to generate a saturation field which locally cuts the magnetic flux induced in said magnetic core by said primary current, creating heterogeneity in said magnetic circuit and generating an asymmetry in the magnetic flux flow.

In addition, said magnetic core can be angled to create heterogeneity in the magnetic circuit and generate asymmetry in magnetic flux flow.

Said detection coil may advantageously be located in a zone of said magnetic core opposite said air gap, said magnet and/or said angle to maximize the usable output voltage.

In the preferred embodiment of the invention, said recovery device further comprises a positioning aid set up to detect the optimum angular position of said magnetic core with respect to said power cable so that said single air gap, said main air gap, said magnet and/or said angle or said bend is located opposite one of the phase conductors of said power cable, the optimum angular position in which the usable output voltage across the terminals of said winding is at its maximum. It may include a visual marker on the housing.

BRIEF DESCRIPTION OF THE DRAWINGS

This invention and its advantages will become clearer in the following description of several embodiments given as non-limiting examples, with reference to the attached drawings, in which:

FIG. 15 is a front view of a second example of a magnetic circuit based on the principle shown in FIG. 12, FIG. 16 is a side view of the magnetic circuit shown in FIG. 15, FIG. 17 is a radial cross-sectional view of the magnetic circuit of an energy recovery device according to another embodiment of the invention, installed around a multiphase power cable, comprising three phase conductors, and FIG. 18 is a radial cross-sectional view similar to FIG. 17 of an energy recovery device according to yet another embodiment of the invention.

DESCRIPTION OF THE EMBODIMENTS

Figure 1:
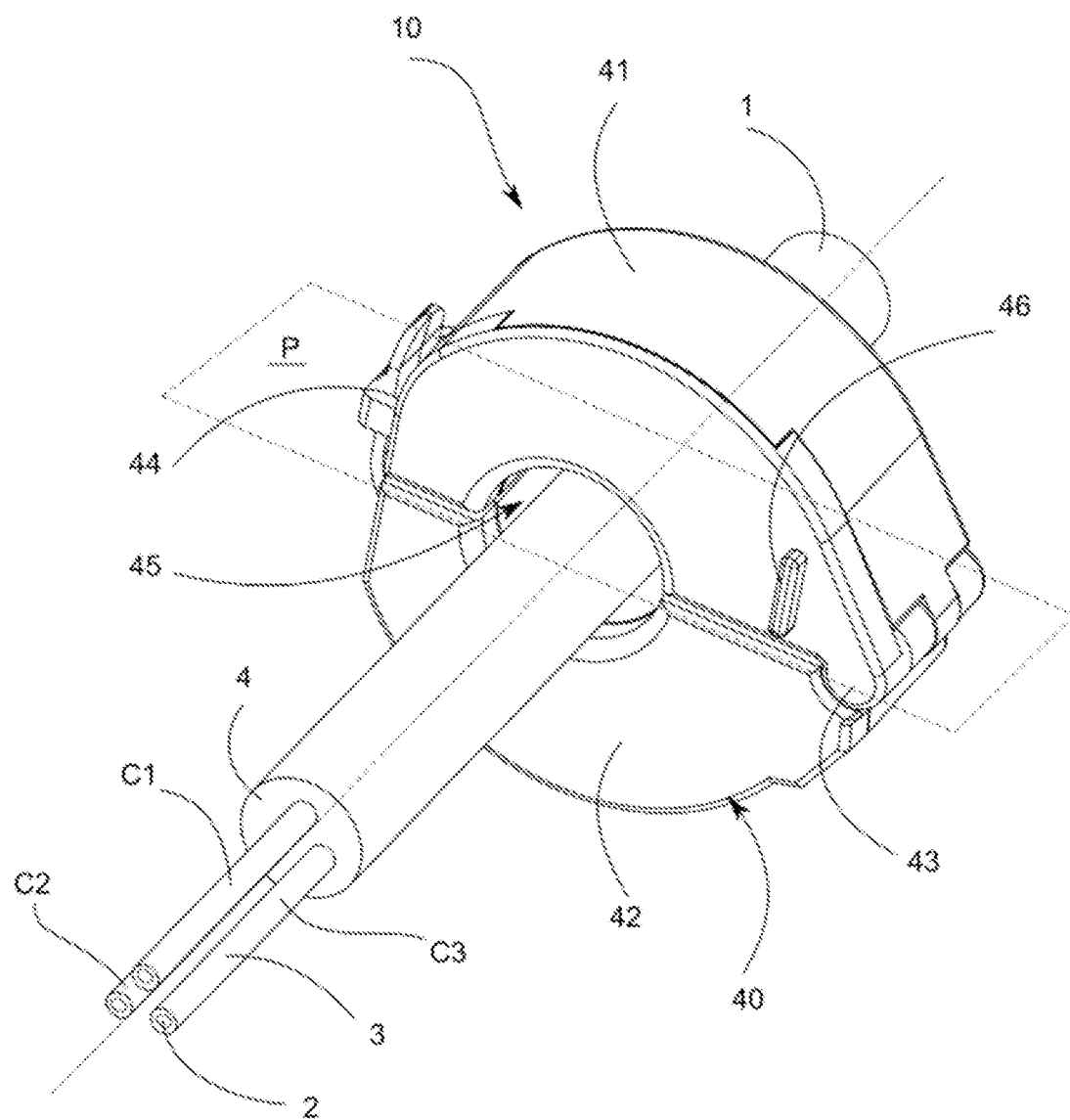
FIG. 1 is a perspective view of an energy recovery device according to the invention, installed around a three-phase power cable.

In the illustrated examples, identical elements or parts have the same reference numbers. Furthermore, terms having a relative meaning, such as vertical, horizontal, right, left, front, rear, above, below, etc., are to be interpreted under normal conditions of use of the invention, and as represented on the figures.

With reference to the figures, the electrical energy recovery device 10 according to the invention is a non-invasive device that can be installed directly around a single-phase or multi-phase power cable 1. It comprises a magnetic core 20 arranged to form a magnetic circuit able to pick up a magnetic field induced by a primary current passing through the power cable 1 forming a primary circuit. It also includes a detection coil 30 arranged around a section of the magnetic core 20 and forming a secondary circuit for inducing a secondary current from the sensed magnetic field and supplying a usable output voltage U at its terminals. In the examples shown, magnetic core 20 has the shape of a closed or openable torus. By "torus" we mean a solid that revolves or not, with or without circular cross-section, forming a loop all around the power cable.

To obtain the functionality and operability of the recovery device 10 mounted as a differential current sensor, the electrical energy recovery method according to the invention consists of making a heterogeneous magnetic circuit by deliberately creating heterogeneities and/or asymmetries within the recovery device 10, and/or between the recovery device 10 and the power cable 1, to exploit a phenomenon known as "false homopolar currents" (Bruno Colin's thesis "*Caracterisation et Reduction des Anomalies de Mesure dans les Capteurs de courant differentiels Differentiel*"-doctoral thesis from INP Grenoble presented on Apr. 2, 2007). In differential current sensors, the risk of false homopolar currents appearing is reduced as much as possible to avoid distorting the sensor response, with particular attention paid to the regularity, homogeneity and symmetry of these sensors. The invention, on the other hand, seeks to exploit the phenomenon of false homopolar currents as far as possible in order to induce the circulation of a magnetic flux in the magnetic core 20 and therefore generate a voltage level U across the detection coil 30 sufficient to power external electrical systems, such as sensors, probes and other accessories. The recovery process also seeks to create the greatest possible heterogeneities and/or asymmetries with the aim of amplifying the phenomenon of false homopolar currents to increase the level of usable output voltage U.

The heterogeneities and/or asymmetries created within the recovery device 10 and/or between the recovery device 10 and the power cable 1 can be obtained by playing on the various following characteristics, which can be used alone or in combination with each other to amplify the usable output voltage level U:

adding one or more air gaps E, E1, E2 to the magnetic core 20 to create one or more physical breaks and make the magnetic circuit heterogeneous and asymmetrical, non-uniform distribution of the detection coil 30 on the magnetic core 20, a position of the specific detection coil 30 relative to said air gap(s) added to the magnetic core 20, an off-center position of the magnetic core 20 relative to the power cable 1, an adjusted angular position of the recovery device 10 relative to the power cable 1 so as to maximize the level of the usable output voltage U of the recovery device 10, adding one or more magnets to the magnetic circuit to locally saturate the magnetic core, adding one or more angles to the magnetic core.

Each of these characteristics generates disturbances within said magnetic circuit, helping to make the magnetic circuit heterogeneous. Various embodiments are described with reference to the figures to illustrate the implementation of these characteristics, without these examples being limitative.

Figure 10:
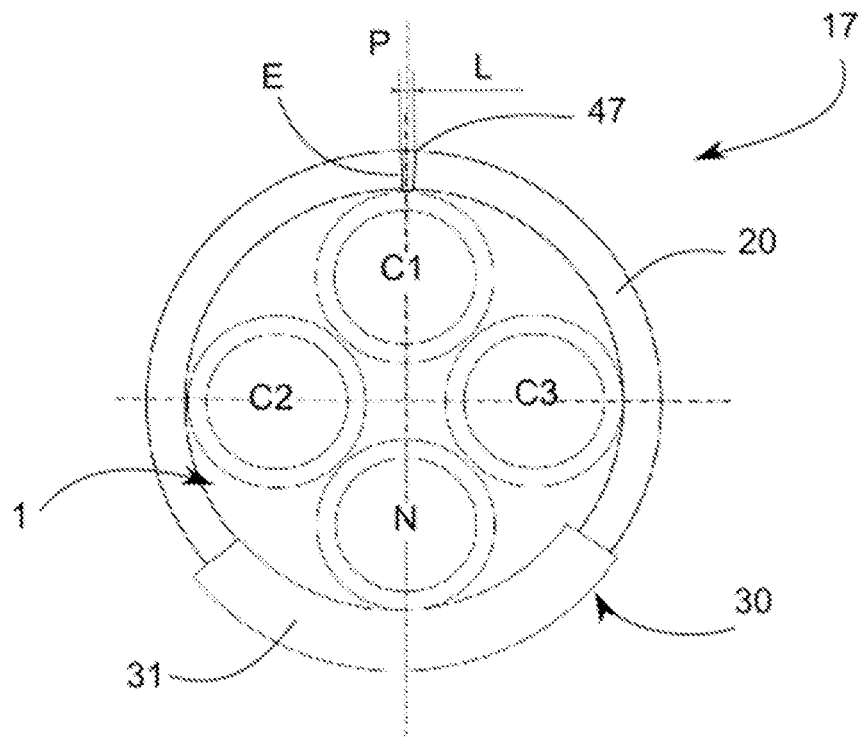
FIG. 10 is a radial cross-sectional view of the magnetic circuit of an energy recovery device according to the invention, installed around a multiphase power cable, comprising three phase conductors and a neutral conductor.
Figure 11:
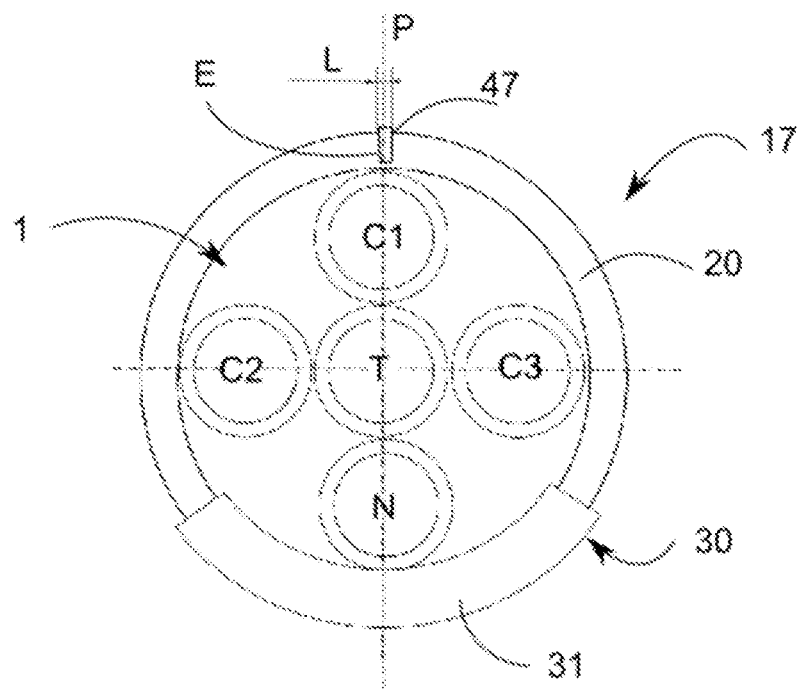
FIG. 11 is a radial cross-sectional view of the magnetic circuit of an energy recovery device according to the invention, installed around a multiphase power cable comprising three phase conductors, a neutral conductor and an earth conductor.

The term "power cable" refers to any single-phase, three-phase or multi-phase power cable 1 with at least two phase conductors C1, C2, C3, a neutral conductor N (FIG. 10) and/or an earth conductor T (FIG. 11). It can have a circular cross-section as shown, but can also be oval, square, rectangular or any other cross-section as required. A current, also called primary current, flows through each phase conductor C1, C2, C3. Each conductor has a conductive core 2 made of copper or other electrically conductive material, surrounded by an insulating sheath 3. All conductors are enclosed in a protective sheath 4 and together form power cable 1.

With particular reference to FIG. 1, the recovery device 10 comprises an openable housing 40, within which magnetic core 20 and detection coil 30 are held. Housing 40 is preferably made of insulating material. It can form a shell in which the magnetic core provided with its detection coil is mounted via retaining members, such as positioning studs, spring members, foam wedges, or any other equivalent means. It can also be obtained by over molding around the magnetic core provided with its detection coil, or by any other manufacturing and/or assembly process. Housing 40 comprises two segments 41, 42 joined by a hinge 43 on one side and a locking member 44 on the other side. Housing 40 has a passage window 45 for a power cable 1. The cross-section of passage window 45 may correspond to the cross-section of power cable 1. In addition, passage window 45 may or may not be off-center with respect to magnetic core 20, in order to offset the secondary circuit with respect to the primary circuit.

The housing 40 can include a visual marker 46 on one of its sides to help the operator detect the optimum angular position of the recovery device 10 relative to the phase conductors C1, C2, C3, when installing it around the power cable 1, as will be explained later.

FIGS. 2 to 5 illustrate four alternative embodiments of a recovery device 10, 11, 12, 13 designed for a single-phase power cable 1. In the various alternatives, the recovery device 10, 11, 12, 13 is installed off-center around a single-phase power cable 1, i.e., magnetic core 20 is off-center with respect to the power cable 1 to deliberately create an asymmetry in the magnetic circuit between the primary and secondary circuits.

Figure 2:
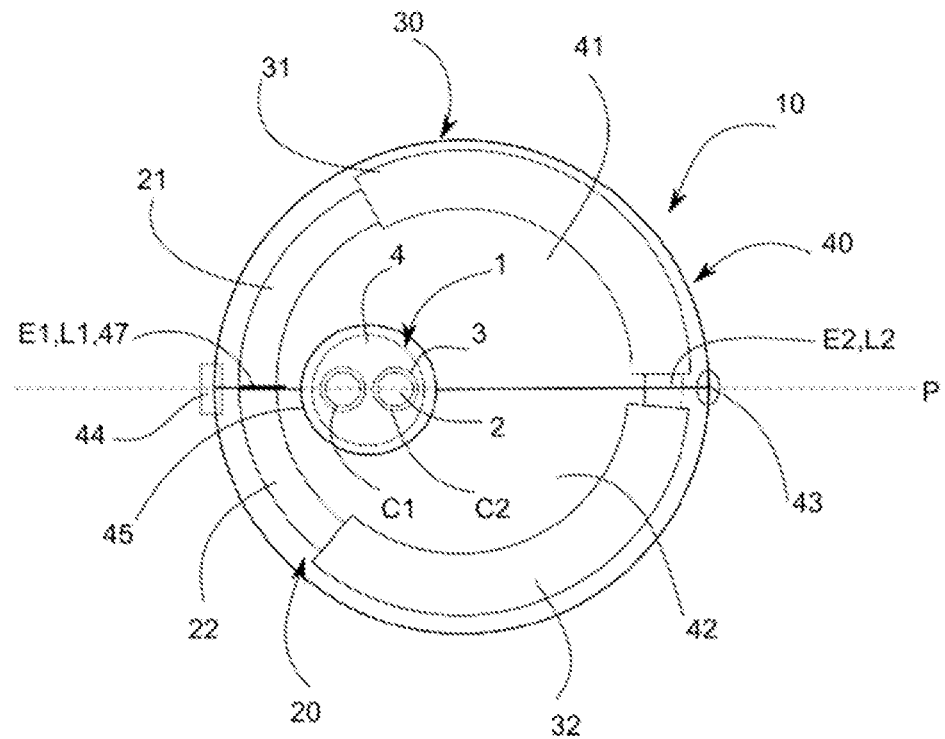
FIG. 2 is a radial cross-sectional view of an energy recovery device according to the invention, installed around a single-phase power cable.

In FIG. 2, recovery device 10 comprises the housing 40 described with reference to FIG. 1, featuring an off-center passage window 45. Passage window 45 is directly obtained by the asymmetrical shape of the two segments 41, 42 forming said housing 40. Recovery device 10 also comprises a magnetic core 20, in the form of a circular, open torus, and a detection coil 30 divided into two windings 31, 32. The two coils 31, 32 must be connected in series to add the voltages across each coil and obtain the highest possible voltage level U.

The opening magnetic core 20 consists of two half-tori 21, 22. They are preferably symmetrical with respect to a median plane P. In this way, the magnetic core 20 necessarily features two air gaps E1, E2 located in mid-plane P, resulting in a heterogeneous magnetic circuit. To add an asymmetry to the magnetic circuit, the two air gaps E1, E2 have different widths, namely: a main air gap E1 of width L1 between the free ends of the two half-tori 21, 22, and a secondary air gap E2 of width L2 between the contacting ends of the two half-tori 21, 22, in line with the hinge 43 of housing 40, in which L2 is less than L1.

The main air gap E1 can have a width L1 of at least 100μ.m. To guarantee the width L1 when the housing 40 is closed, a calibrated non-magnetic spacer 47 can be added to the main air gap E1, made, for example, of Bakelite®, polychlorinated biphenyl (PCB), or any other equivalent non-magnetic material. In practice, width L1 of main air gap E1 can preferably be between 0.5 and 2 mm.

Secondary air gap E2 is rather disruptive to the operation of recovery device 10. We then minimize its width L2 to reduce its effect. The corresponding ends of the two half-cori 21, 22 of the magnetic core 20 are carefully cut and surfaced to obtain a width L2 equal to at most 20 μm when the two ends are in contact, without this value being limitative.

The detection coil 30 of the recovery device 10 consists of two coils 31, 32 positioned on each half-torus 21, 22 of the magnetic core 20 and connected in series, thereby increasing the output voltage level U usable at the terminals of detection coil 30. In the example shown in FIG. 2, they are identical; each extending over an angular sector of less than 180°, are spaced apart from main air gap E1, and are placed symmetrically with respect to median plane P, without these characteristics and positioning being limitative.

The optimum angular position of the recovery device 10 relative to the single-phase power cable 1 is such that the median plane P of magnetic core 20 passes through the two phase conductors C1 and C2, main air gap E1 is as close as possible to one of the phase conductors C1, and detection coil 30 is as far away as possible from the phase conductors C1, C2 and main air gap E1. Main air gap E1 should preferably be positioned opposite a phase conductor C1, as its purpose is to ensure that the two half cori 21 and 22 do not strictly channel the sum of the magnetic fluxes generated by phase conductors C1 and C2. In addition, detection coil 30 should preferably be located opposite main air gap E1, and centered on the phase conductor axis C1, C2 coincident with mid-plane P to recover a sufficient output voltage level U across detection coil 30. In this configuration, the magnetic flux is relatively homogeneous in magnetic core 20 and detection coil 30 can be divided into two or more windings 31, 32. Simulations, confirmed by laboratory tests, show that induction levels are highest in the alignment of phase conductors C1, C2.

Figure 3:
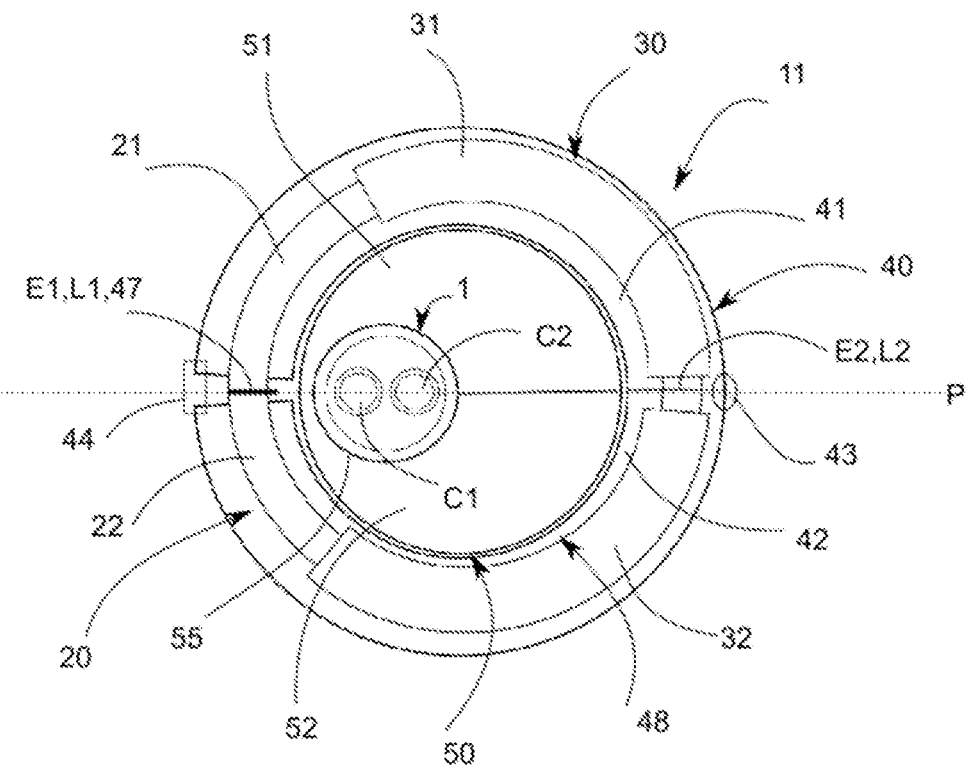
FIG. 3 is a cross-sectional view similar to FIG. 2, of a recovery device for a single-phase power cable, according to a first embodiment of the invention.

Recovery device 11 in FIG. 3 differs from that in FIG. 2 in that magnetic core 20 is offset from power cable 30. In this alternative embodiment, openable housing 40 comprises two symmetrical segments 41, 42 in the shape of an arc of a circle, delimiting a circular central opening 48. A decentralizing member 50 is added either to central opening 48 of housing 40, or to power cable 1 before installing recovery device 11. The decentralizing member 50 is formed by two half-shells 51, 52 which define between them an off-center passage window 55 for power cable 1.

Figure 4:
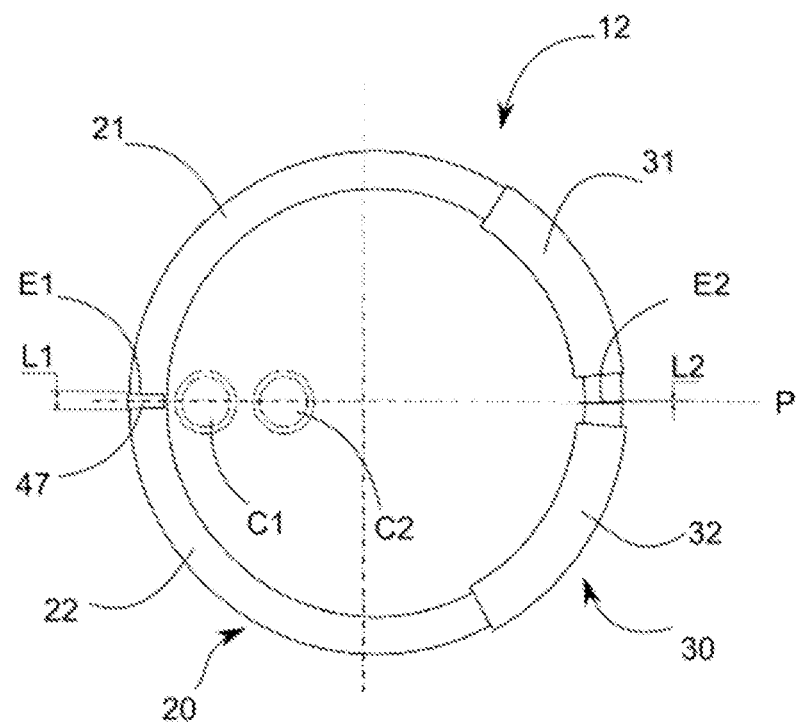
FIG. 4 is a radial cross-sectional view of the magnetic circuit of a recovery device for a single-phase power cable, according to a second embodiment of the invention.

Recovery device 12 shown in FIG. 4, is represented only by its magnetic core 20 and detection coil 30, and power cable 1 only by its two phase conductors C1 and C2. Recovery device 12 differs from that shown in FIGS. 2 and 3 in that its detection coil 30 is also divided into two windings 31 and 32. In this example, the two windings 31, 32 are identical, connected in series, and each extends over an angular sector of less than 90°. In accordance with the optimum angular position determined by simulations and tests, they are located in an area opposite the main air gap E1, which is located opposite one of the phase conductors C1 and in alignment with the two phase conductors C1 and C2.

Figure 5:
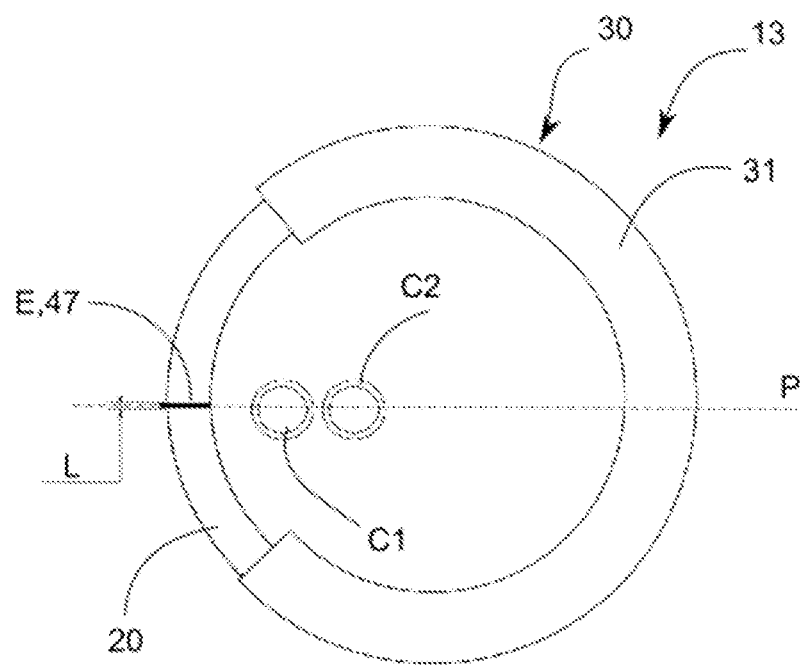
FIG. 5 is a cross-sectional view similar to FIG. 4 of a recovery device for a single-phase power cable, according to a third embodiment of the invention.

Recovery device 13 shown in FIG. 5, is represented only by its magnetic core 20 and detection coil 30, and power cable 1 only by its two phase conductors C1 and C2. Recovery device 13 differs from that of FIGS. 2 to 4 in that its magnetic core 20 consists of a closed torus with a single air gap E, and its detection coil 30 extends over a wide angular sector. Detection coil 30 can consist of a single coil 31 as shown, or a plurality of coils connected in series (not shown). It can extend over an angular sector of around 240°, centered on a median plane P passing through the single air gap E. The remaining section of magnetic core 20 in which the single air gap E is located is deliberately left without a detection coil, as the magnetic flux around the single air gap E is weak and therefore unusable and can also counteract the magnetic flux circulating in the turns of detection coil 30.

Closed magnetic core 20 has a single air gap E, making the magnetic circuit heterogeneous and perfectly asymmetrical. This single air gap E is created by a complete cross-section of magnetic core 20, and its width L must be at least 20 µm. For reasons of industrial feasibility, width L of the single air gap E is preferably between 0.5 and 2 mm. Width L of the single air gap E can also be guaranteed by the addition of a calibrated non-magnetic spacer 47, as for the main air gap E1 of the previous examples.

FIGS. 6 to 9 illustrate four alternative embodiments of a recovery device 14, 15, 16 designed for a three-phase power cable 1. In the various alternatives, the recovery device 14, 15, 16 is installed centrally around a three-phase power cable 1, but could be decentralized using the means described with reference to FIGS. 2 and 3. In these figures, the recovery device 14, 15, 16 is represented only by its magnetic core 20 and its detection coil 30, and the power cable 1 only by its three phase conductors C1, C2 and C3.

Figure 6:
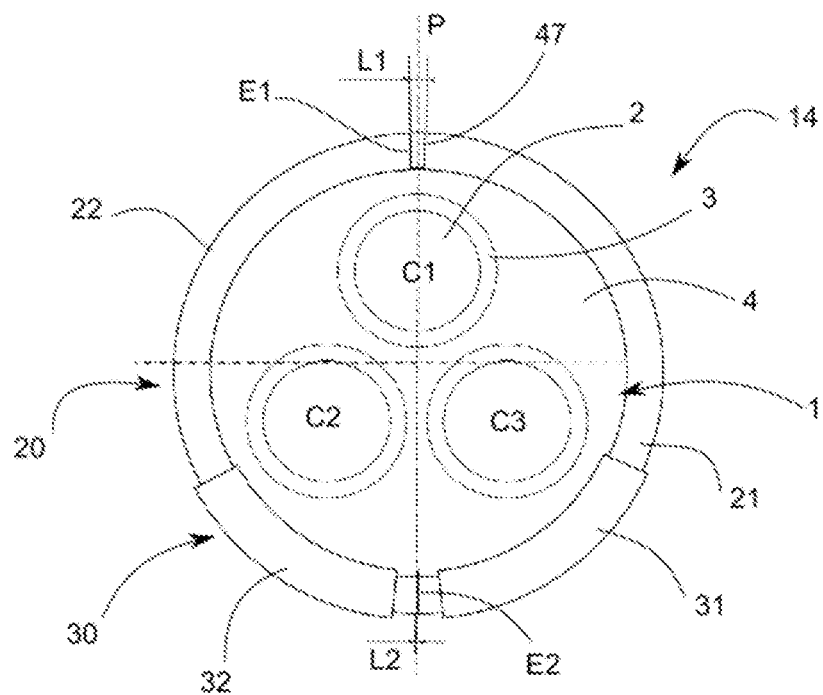
FIG. 6 is a radial cross-sectional view of the magnetic circuit of an energy recovery device according to the invention, installed around a three-phase power cable.

In FIG. 6, recovery device 14 has the same configuration as recovery device 12 in FIG. 4. It comprises a magnetic core 20 in the form of an opening torus and a detection coil 30 divided into two series-connected coils 31, 32. Magnetic core 20 consists of two half-cori 21, 22 symmetrical with respect to a mid-plane P. It has two air gaps E1, E2 located in mid-plane P and of different widths: a main air gap E1 of width L1 and a secondary air gap E2 of width L2 less than width L1.

The optimum angular position of the recovery device 14 relative to the three-phase power cable 1 is such that the main air gap E1 is opposite one of the phase conductors C1, and the detection coil 30 is in a zone opposite main air gap E1. This optimum angular position was determined by simulations and confirmed by tests described with reference to FIG. 7.

Figure 7:
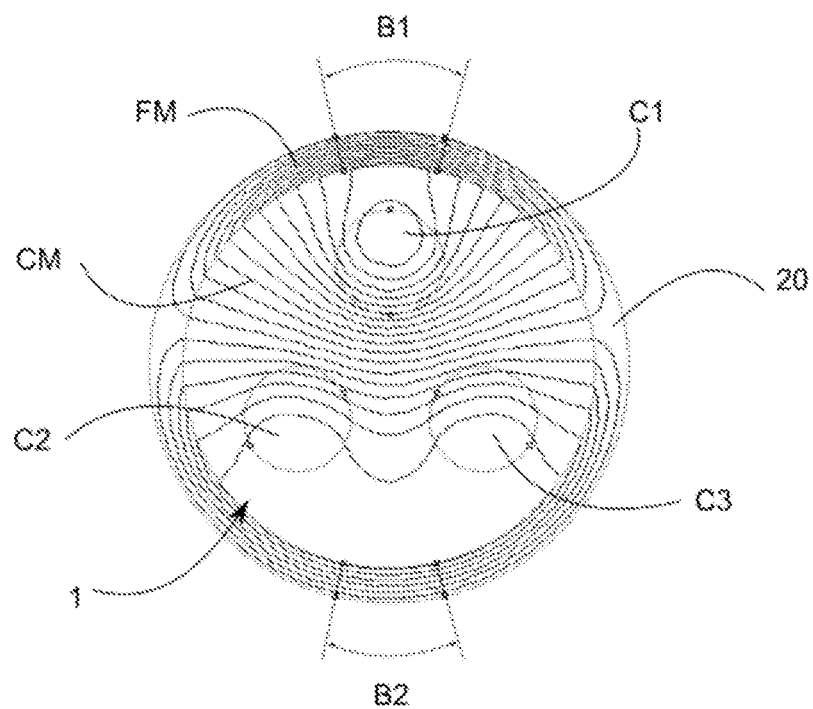
FIG. 7 is a cross-sectional view similar to FIG. 6, showing the magnetic field lines generated by the primary current flowing in the phase conductors of the three-phase power cable.

FIG. 7 illustrates the radial magnetic field CM created by the primary current flowing in phases C1, C2, C3 of a three-phase power cable 1 at a given instant and the induced magnetic flux FM flowing in a closed magnetic core 20 with no air gap. In a balanced electrical network, the currents flowing in the three phases C1, C2, C3 create a magnetic flux FM rotating in the magnetic core 20 placed around these three phases. As in the case of a single-phase power cable, the period average of the sum of magnetic fields CM is zero, but this is not true in particular zones of the magnetic core 20. Simulations, confirmed by tests, were used to determine the position of these particular zones in the magnetic core 20, and two windings, B1 and B2, were positioned diametrically opposite each other. The B1 winding that recovers the most voltage is the one opposite one of the C1 phases. As the voltage is in phase with the current, it is not possible to place three coils opposite each phase and connect them together, as the voltages are 120° out of phase with each other. Adding up these voltages is therefore not straightforward.

These simulations and tests were repeated with the same magnetic core (not shown). This time with an air gap provided, and several windings evenly distributed over the magnetic core to test the performance of this topology as a function of the position of the air gap relative to the phase conductors. Simulation results, confirmed by tests, show that the windings with the highest induced voltage are those located in the area opposite the air gap, and that the highest voltage recovered across these windings is obtained when the air gap is opposite one of the phase conductors. This arrangement has therefore been selected as the optimum angular position of the recovery device 14, 15, 16 in relation to a three-phase power cable 1.

Figure 8:
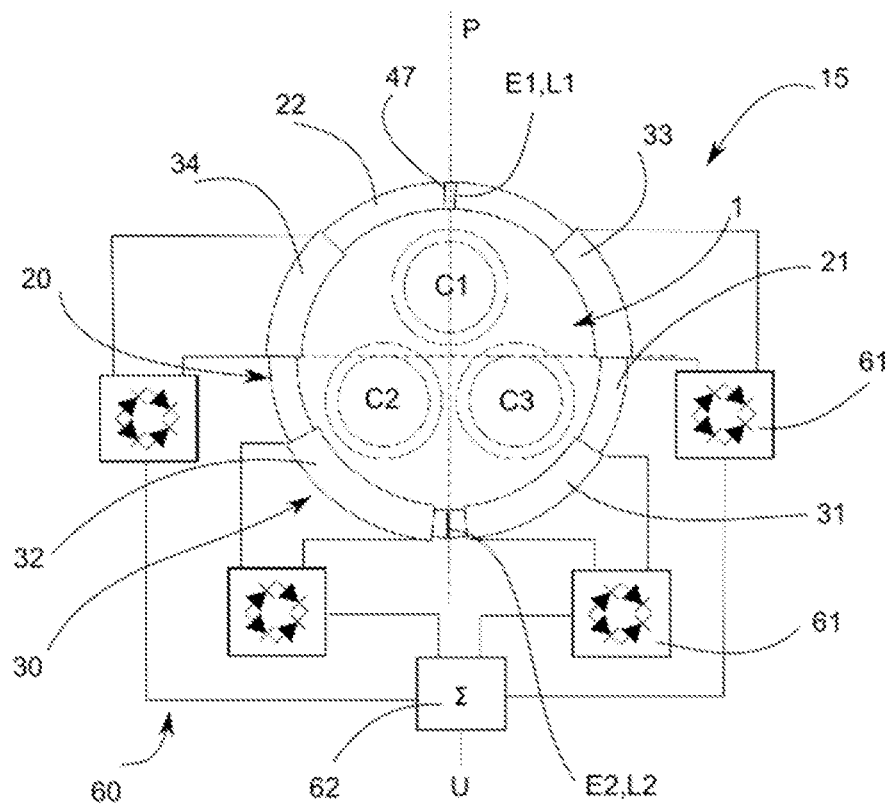
FIG. 8 is a radial cross-sectional view of the magnetic circuit and its signal processing unit, of a recovery device for a three-phase power cable, according to a first alternative embodiment of the invention.

The recovery device shown 15 in FIG. 8 differs from that in FIG. 6 in that its detection coil 30 comprises four windings 31, 32, 33, 34 connected in series. Each winding 31, 32, 33, 34 extends over an angular sector of less than 90° and are symmetrical in pairs with respect to the median plane P passing through the two air gaps E1 and E2. Two first windings 31 and 32 are located in an area opposite the main air gap E1, and two second windings 33 and 34 are located in areas to the side of the main air gap E1, but at a distance from said main air gap E1. The voltage level across the first windings 31 and 32 is therefore much higher than the voltage level across the second windings 33 and 34, which may be optional.

FIG. 8 also shows a signal processing unit 60, an integral part of the recovery device 15. As previously mentioned, if windings are positioned in the three sectors between phase conductors C1 and C2, C2 and C3, C3 and C1, the induced voltages are more or less 120° out of phase and therefore cannot be added together in a simple way. They can, however, be straightened out individually and then added together. To this end, the signal processing unit 60 comprises four diode bridges 61, each connected to the terminals of a winding 31, 32, 33, 34 to rectify the voltage across each, and a summing circuit 62 to sum the four voltages and obtain the highest possible output voltage level U.

Figure 9:
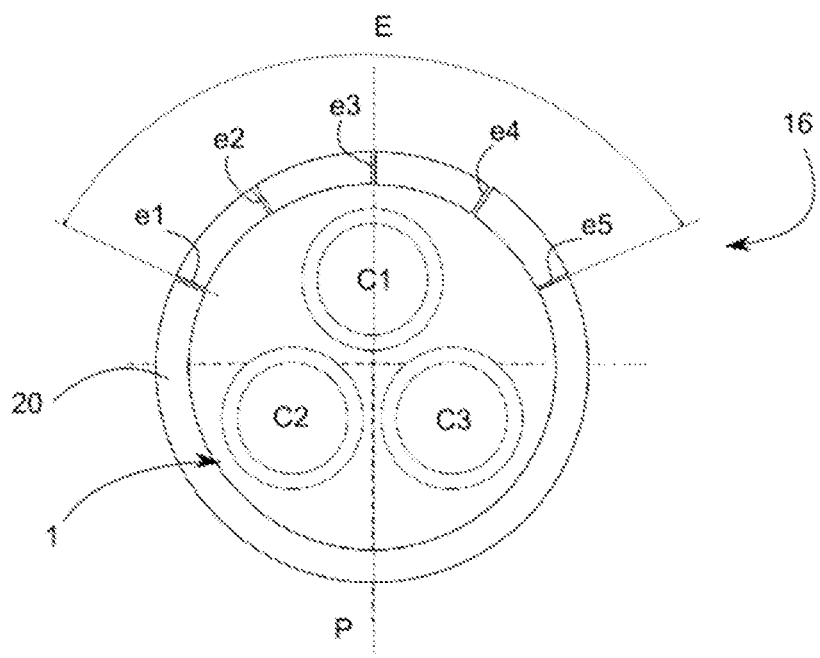
FIG. 9 is a cross-sectional view similar to FIG. 6 of the magnetic circuit of a recovery device for a three-phase power cable, according to a second alternative embodiment of the invention.

Recovery device 16 of FIG. 9 is shown only by its magnetic core 20, which can be equipped with a detection coil 30 according to at least one of the variants described with reference to the previous figures. This recovery device 16 differs from that of FIGS. 6 and 7 in its magnetic core 20, which is in the form of a closed torus, and in its single air gap E, which is divided into a plurality of elementary air gaps e1, e2, e3, e4, e5. The plurality of elementary air gaps e1, e2, e3, e4, e5, extend over an angular sector of the magnetic core 20 at most equal to 120°, centered on one of the phase conductors C1. The elementary air gaps e1, e2, e3, e4, e5, have a reduced width compared to that of the single air gap E described with reference to FIG. 4. For example, the sum of the widths of the individual air gaps e1, e2, e3, e4, e5, can be substantially equal to the width L of the single air gap E. This arrangement reduces any leakage lines at the single air gap E, and thus limits electromagnetic interference.

FIGS. 10 and 11 illustrate the same recovery device 17 designed for a multiphase power cable 1. In FIG. 10, the recovery device 17 is installed around a power cable 1 comprising four conductors, including three phase conductors C1, C2, C3 and a neutral conductor N. And in FIG. 11, the recovery device 17 is installed around a power cable 1 comprising five conductors, including three phase conductors C1, C2, C3, a neutral conductor N and an earth conductor T. The conductors are centered on the magnetic core 20. Recovery device 17 also comprises a magnetic core 20, in the form of a closed torus, provided with a single air gap E, and a detection coil 30 made up of a single winding 31. An open version of the recovery device 17 is also available with two windings distributed on either side of the secondary air gap E2 as shown in FIG. 6.

In this configuration, the optimum angular position of recovery device 17 relative to a multi-phase power cable 1 is the same as that described with reference to FIG. 6. Single air gap E is located opposite one of the phase conductors C1, and the detection coil 30 is located in an area opposite single air gap E.

FIGS. 12 to 16 illustrate two further embodiments of a recovery device 18, 19 according to the invention, in which a magnet 70 is added to the magnetic circuit to replace or supplement one of the air gaps E, E1, E2. In a magnetic circuit, an air gap is a zone of high reluctance with respect to the rest of the circuit. To increase the magnetic reluctance locally, the magnetic circuit can either be cut, which has the effect of inserting a layer of air with a relative magnetic permeability equal to 1, as in the devices shown in FIGS. 2 to 11, or the material of the magnetic core 20 can be locally saturated to minimize the apparent permeability as seen by the field lines induced by the primary currents, as in FIGS. 12 to 16.

And to saturate the material of the magnetic core 20, a secondary magnetic field, called the saturation field CS, must be generated, with an amplitude sufficient to locally saturate the magnetic material (e.g., a value greater than 1000 A/m for an Iron-Silicon magnetic core) and locally lower the magnetic permeability to a level below 1000, for example. In addition, the CS saturation field must be oriented preferentially in a direction perpendicular to that of the field lines induced by the primary currents. This saturation field CS can advantageously be generated by one or more magnets 70. Preferably, a permanent magnet 70 is chosen, with poles 71 (North) and 72 (South) positioned on either side of the magnetic core 20. The width of the saturated zone corresponds approximately to the width of poles 71, 72 of magnet 70.

Figure 12:
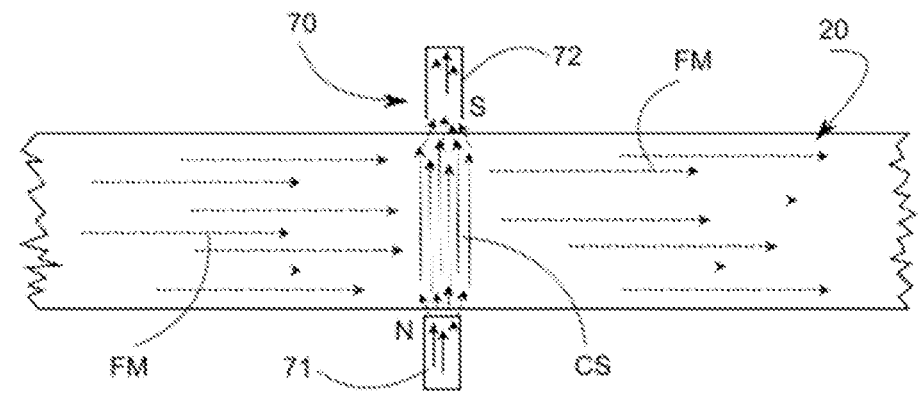
FIG. 12 is a schematic diagram of the operating principle of a magnetic circuit for an energy recovery device according to another embodiment of the invention.
Figure 12:
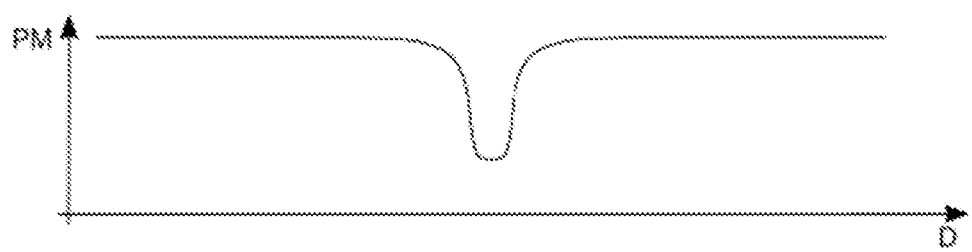

FIG. 12 illustrates this saturation phenomenon by showing, in its upper part, a diagram of a magnetic circuit comprising a magnet 70 arranged perpendicular to a section of a magnetic core 20, and, in its lower part, a corresponding diagram illustrating a curve of the magnetic permeability PM of the magnetic core 20 over the distance D of said section. It can be seen that magnet 70 generates a saturation field CS between its north pole 71 and its south pole 72, represented by CS field lines, which perpendicularly intersects the magnetic flux induced by the primary currents in magnetic core 20, represented by FM field lines.

Figure 13:
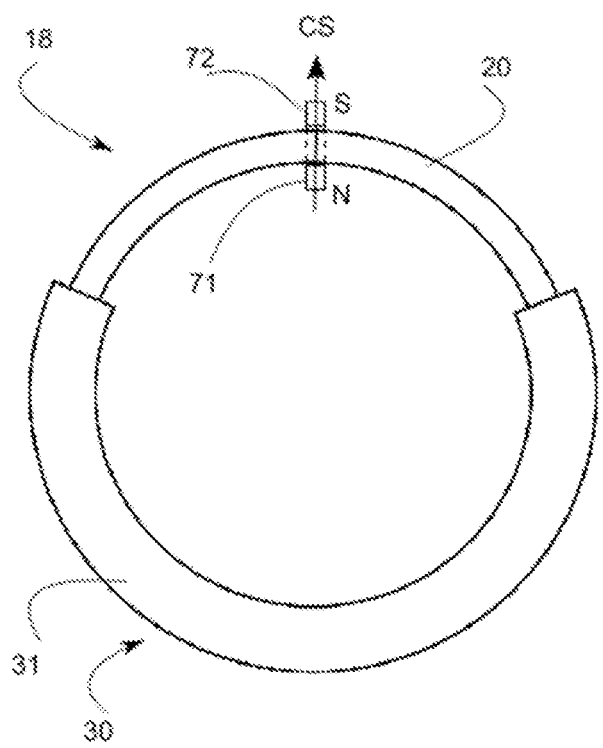
FIG. 13 shows a front view of a first example of a magnetic circuit based on the principle shown in FIG. 12.
Figure 14:
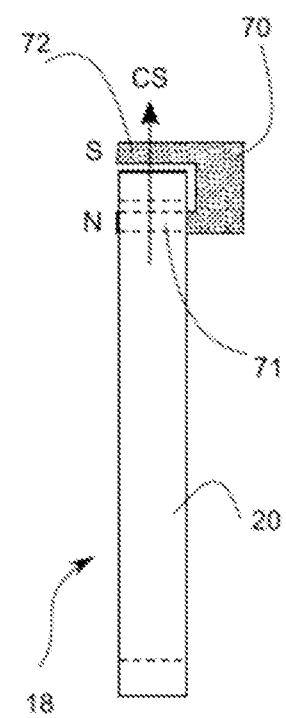
FIG. 14 is a side view of the magnetic circuit shown in FIG. 13.

The recovery device 18 of FIGS. 13 and 14 is represented by its closed magnetic core 20, and by its detection coil 30 consisting of a single coil 31, as in FIG. 5. This recovery device 18 differs from the one shown in FIG. 5 in that a magnet 70 replaces air gap E, which can be advantageous. Magnet 70 creates an air gap without physically cutting the core, as explained above, which can be advantageous. In this example, magnet 70 is U-shaped, with the arms forming a north pole 71 (N) and a south pole 72 (S). It is arranged laterally and overlaps the magnetic core 20 to create a saturation field CS directed radially, for example from the center towards the outside of the magnetic core 20.

Recovery device 19 of FIGS. 15 and 16 is represented by its open magnetic core 20 with two air gaps E1, E2, and by its detection coil 30 consisting of two windings 31, 32, one on each half-torus 21, 22, as in FIGS. 2 and 3. This recovery device 19 differs from those of FIGS. 2 and 3 in that a magnet 70 completes main air gap E1. The presence of magnet 70 enables two air gaps E1, E2 of identical widths to be produced, which can be advantageous. Magnet 70 artificially increases the width of one of the two air gaps E1, E2. This magnet 70 must therefore be positioned on the air gap, and preferably on the more accessible main air gap E1. As in the previous example, magnet 70 is U-shaped, the arms of which form a north pole 71 (N) and a south pole 72 (S). This time, it is rotated by a quarter turn to be positioned tangentially on the magnetic core 20 and to create a saturation field CS directed axially, for example from left to right in the figure.

Of course, the lateral position of magnet 70 in recovery device 18 may be suitable for recovery device 19, and conversely the tangential position of magnet 70 in recovery device 19 may be suitable for recovery device 18. Similarly, magnet 70, in any of its positions, can be added to the other recovery devices 10 to 16, in addition to and on one of the air gaps.

Generally speaking, the magnetic core 20, used in recovery device 10 to 19 of the invention, is either a closed torus or an openable torus. When using a closed torus, the recovery device 13, 16, 17, 18 must be slipped onto the power cable 1 prior to connection. Its position along the power cable 1 can be adapted as required. The use of an openable torus allows the recovery device 10, 11, 12, 14, 15, 19, to be installed on an existing power cable 1 without having to disconnect it. The magnetic core 20 is preferably made of a highly magnetically permeable material such as an amorphous or nanocrystalline iron-nickel alloy, or equivalent. In cases where the primary currents in phase conductors C1, C2, C3 are high (e.g., greater than 50A), lower-permeability alloys such as iron-silicon, ferrite or equivalent can be used.

In the examples shown, the magnetic core 20 consists of a circular torus, forming a solid of revolution, with a perfectly uniform circular cross-section. Of course, this is not the only possible example, and any other geometric or non-geometric shape may be suitable, with or without a uniform cross-section. By way of example, a toroid may be oval, rectangular, square, triangular, hexagonal or any other shape, provided it completely surrounds the power cable 1. In this way, a magnetic core 20 can be produced with one or more, more or less rounded angles and/or bends, helping to make the magnetic circuit heterogeneous.

FIG. 17 shows an example of an energy recovery device 14' with an egg-shaped magnetic core 20, the apex of which has a rounded corner 24. In this example, the core cross-section is uniform, and the magnetic characteristics are homogeneous throughout the magnetic core 20. In this case, an air gap E and/or a magnet (not shown) must be added to create heterogeneity in the magnetic circuit. The optimum angular position of the recovery device 14' corresponds to that illustrated in which the air gap E is provided in the rounded corner 24 and positioned opposite one of the phase conductors C1 housed in this rounded corner 24.

FIG. 18 shows another example of an energy recovery device 14" featuring an egg-shaped magnetic core 20 with a sharp angle 25 vertex. In this example, the core cross-section is no longer uniform at the sharp angle 25 and the magnetic characteristics of magnetic core 20 are disturbed. In this case, it is no longer necessary to add an air gap E and/or a magnet, as the presence of this sharp angle 25 contributes to creating heterogeneity in the magnetic circuit. The optimum angular position of the recovery device 14" corresponds to the one illustrated in which one of the C1 phase conductors is housed and positioned facing this sharp angle 25.

The detection coil 30, used in the recovery device 10 to 19 of the invention, is made up of one or more windings 31, 32, 33, 34, each winding being obtained by winding at least one copper wire insulated by enameling or equivalent. The winding turns are preferably perpendicular to the field lines circulating in the magnetic core 20. As explained with reference to the figures, the detection coil 30 is judiciously located in a zone opposite the single E, or main air gap E1, i.e., the widest air gap, or in a zone opposite the magnet 70 replacing or completing one of the air gaps, or finally in a zone opposite the angle 24, 25 created in the magnetic core 20. It can also be distributed over the entire magnetic core 20, leaving a free portion of approximately 90° centered on the single air gap E or main air gap E1, or on magnet 70.

The voltage U at the output of the 30 detection coil is an AC voltage that can be used without shaping to power lighting systems, for example. For powering electronic systems, this voltage U can be rectified and filtered by a signal processing unit 60 (FIG. 8) to obtain a DC voltage. This signal processing unit 60 can be associated with an energy storage device (not shown) to provide sufficient autonomy in the event that there is no primary current in the phase conductors.

The voltage U at the output of the detection coil 30, also known as the usable output voltage, must be sufficient to supply one or more electrical systems, such as, by way of non-limiting examples, one or more sensors for temperature, position, current, wear, etc., one or more lighting, signaling, communication elements, etc., or to provide an indication of the primary current flow in an electrical installation in the case of single-phase or three-phase operation, one or more lighting, signaling or communication elements, etc., or to provide an indication of the primary current flow in an electrical installation in the case of a single-phase or perfectly balanced three-phase system, without these application examples being limitative. By way of example, the usable output voltage U can be at least 3 Volts after processing, without this value being limitative. If self-powered electrical systems are connected systems that communicate via a wireless system, then the instantaneous consumption of these systems may be higher and will need to be considered when managing the output voltage U.

The angular position of the recovery device 10 to 19 of the invention relative to power cable 1 is essential for exploiting false homopolar currents, and maximizing the level of the usable output voltage U. When mounted, for example, on a three-phase power cable 1, the recovery device 10 to 19 must be oriented so as to place the single E, or main air gap E1 and/or the magnet 70 and/or the angle 24, 25 of the magnetic core 20 opposite a phase conductor C1, with the other two phase conductors C2, C3 in the vicinity of the secondary air gap E2, if present, and the detection coil 30. Therefore, it is imperative to carry out an angular adjustment operation of the recovery device 10 to 19 position after closing it on the power cable 1. This operation must be carried out in the presence of the primary current in the power cable. The challenge is to find the optimum angular position to obtain the highest possible output voltage U.

A positioning aid (not shown) indicates when the optimum angular position has been reached. This aid can use a detection of the voltage U at the output of the detection coil 30 combined with a display in the form of a visual marker 46 (FIG. 1) for the operator. This visual marker 46 can be a graduated scale, a color scale, a strip of light-emitting diodes (LEDs), a sight glass, a voltmeter display or a combination of these, with or without an audible signal. This positioning aid can either be built into the housing 40 (FIG. 1), or separate and used only when the recovery device 10 to 19 is mounted on the power cable 1.

Once the optimum orientation has been reached, the position of the recovery device 10 to 19 can be locked to power cable 1 by any suitable locking system, whether removable or not, such as needle screws, jaws, clamps attached to fasteners (not shown) built into the housing.

This invention is of course not limited to the embodiments described but extends to any modifications and alternatives obvious to a person skilled in the art, within the limits of the appended claims. In addition, the technical characteristics of the various embodiments and alternatives mentioned above can be combined in whole or in part.

The invention claimed is:

1. A method of recovering electrical energy from a power cable comprising at least two phase conductors, the method comprising the steps of: installing around said power cable a magnetic core in the form of a torus, to form a magnetic circuit suitable for detecting a magnetic field induced by a primary current passing through the phase conductors of said power cable, equipping said magnetic core with a detection coil for inducing a secondary voltage from said magnetic field and delivering an output voltage at terminals of said detection coil, enabling different types of electrical systems to be supplied, said method further comprising the step of making said magnetic circuit heterogeneous in order to generate an asymmetrical magnetic flux flow within said magnetic circuit, enabling said output voltage to be maximized and thus obtaining a usable output voltage at the terminals of said detection coil.

2. The recovery method according to claim 1, wherein said magnetic core comprises at least one air gap and/or at least one magnet and/or at least one angle to create said heterogeneity in the magnetic circuit and generate said asymmetry in the magnetic flux flow.

3. The recovery method according to claim 2, wherein said magnetic core comprises a single air gap, said method further comprising the steps of providing said magnetic core in the form of a closed torus and cutting a cross section of said magnetic core to create said single air gap whose width is at least 100 µm.

4. The recovery method according to claim 3, further comprising the step of dividing said single air gap into several elementary air gaps distributed over an angular segment of said magnetic core at most equal to 120°.

5. The recovery method according to claim 2, wherein said magnetic core comprises two air gaps, said method further comprising the steps of cutting said magnetic core in two to form an open torus made up of two half-tori and creating said two air gaps, including a main air gap and a secondary air gap.

6. The recovery method according to claim 5, further comprising the step of creating two air gaps of different widths, including said main air gap of width L1 and said secondary air gap of width L2 less than width L1, width L1 being at least equal to 100 µm, and width L2 corresponding to ends in contact with the two half-tori and being at most equal to 20 µm.

7. The recovery method according to claim 5, further comprising the step of dividing said detection coil into at least two coils located in a zone of the magnetic core opposite said main air gap, and placed on either side of said secondary air gap.

8. The recovery method according to claim 1, further comprising the steps of decentering said magnetic core with respect to said power cable to introduce an offset between said phase conductors and said magnetic circuit, creating said heterogeneity in the magnetic circuit and generating said asymmetry in the magnetic flux flow.

9. The recovery method according to claim 2, wherein said magnetic core comprises a magnet, said method further comprising the steps of adding said magnet in said magnetic circuit in replacement of or in addition to the at least one air gap, arranged to generate a saturation field which locally cuts the magnetic flux induced in said magnetic core by said primary current, creating heterogeneity in said magnetic circuit and generating an asymmetry in the magnetic flux flow.

10. The recovery method according to claim 2, wherein said magnetic core comprises an angle, said method further comprising the step of creating an angle in said magnetic core to create heterogeneity in the magnetic circuit and generate an asymmetry in the magnetic flux flow.

11. The recovery method according to claim 2, further comprising the step of positioning said detection coil in a zone of said magnetic core opposite said at least one air gap and/or said at least one magnet and/or said at least one angle to maximize the usable output voltage.

12. The recovery method according to claim 2, further comprising the step of optimizing an angular position of said magnetic core with respect to said power cable so that said at least one air gap and/or said at least one magnet and/or said at least one angle is located opposite one of the phase conductors of said power cable, in which position the output voltage usable at the terminals of said detection coil is at its maximum.

13. The recovery method according to claim 12, further comprising the step of aligning said at least one air gap and/or said at least one magnet and/or said at least one angle with the at least two phase conductors when said power cable is single-phase.

14. The recovery method according to claim 12, further comprising the step of detecting the output voltage at the terminals of said detection coil when installing said magnetic core around said power cable in which said primary current flows, to assist in locating said optimum angular position and locking said magnetic core in this position.

15. A recovery device for recovering energy from a power cable comprising at least two phase conductors, said device comprising a magnetic core, in the form of a closed or open torus, positioned to be installed around said power cable and form a magnetic circuit capable of detecting a magnetic field induced by a primary current passing through said phase conductors, and a detection coil wound around said magnetic core, arranged to induce a secondary voltage from said magnetic field and deliver across said detection coil an output voltage for powering different types of electrical systems, wherein said magnetic circuit is heterogeneous to generate an asymmetrical magnetic flux flow within said magnetic circuit, to maximize said output voltage and to obtain a usable output voltage at terminals of said detection coil.

16. The recovery device of claim 15, characterized in that said magnetic core comprises at least one air gap and/or at least one magnet and/or at least one angle to create said heterogeneity in the magnetic circuit and said asymmetry in the magnetic flux flow.

17. The recovery device of claim 16, characterized in that said magnetic core comprises a single air gap and said magnetic core consists of a closed torus, comprising said single air gap whose width is at least equal to 100 µm.

18. The recovery device according to claim 17, characterized in that said single air gap is divided into several elementary air gaps, distributed over an angular segment of said magnetic core at most equal to 120°.

19. The recovery device according to claim 16, characterized in that said magnetic core comprises two air gaps and said magnetic core is constituted by an open torus, comprising two half-tori and said two air gaps, including a main air gap and a secondary air gap.

20. The recovery device according to claim 19, characterized in that the two air gaps have different widths: said main air gap having a width L1 and said secondary air gap having a width L2 less than the width L1, the width L1 being at least 100 µm, and the width L2 corresponding to contacting ends of the two half-tori and being at most 20 µm.

21. The recovery device according to claim 19, characterized in that said detection coil is divided into at least two coils, located in a zone of the magnetic core opposite said main air gap, and placed on either side of said secondary air gap.

22. The recovery device according to claim 15, characterized in that said recovery device comprises an openable housing in which said magnetic core and said detection coil are kept, and in that said casing comprises a passage window for said power cable, said passage window being off-center with respect to said magnetic core to introduce an offset between said phase conductors and said magnetic circuit, create heterogeneity in said magnetic circuit and generate asymmetry in magnetic flux flow.

23. The recovery device as claimed in claim 22, characterized in that said passage window is formed in an off-center member separate from said housing.

24. The recovery device according to claim 16, characterized in that said magnetic core comprises a magnet in said magnetic circuit in replacement of or in addition to the at least one air gap, arranged to generate a saturation field which locally cuts off the magnetic flux induced in said magnetic core by said primary current, creating heterogeneity in said magnetic circuit and generating an asymmetry in the magnetic flux flow.

25. The recovery device according to claim 16, characterized in that said magnetic core has an angle to create heterogeneity in the magnetic circuit and generate asymmetry in the magnetic flux flow.

26. The recovery device according to claim 16, characterized in that said detection coil is located in a zone of said magnetic core opposite said at least one air gap and/or said at least one magnet and/or said at least one angle to maximize the usable output voltage.

27. The recovery device according to claim 16, characterized in that said recovery device comprises a positioning aid for detecting an optimum angular position of said magnetic core with respect to said power cable so that said at east one air gap and/or said at least one magnet and/or said at least one angle is located opposite one of the phase conductors of said power cable, the optimum angular position in which the usable output voltage at the terminals of said coil is at its maximum.

28. The recovery device according to claim 27, characterized in that said positioning aid comprises a visual marker on said housing.

* * * * *